United States Patent
Kikuchi

(10) Patent No.: US 7,440,776 B2
(45) Date of Patent: Oct. 21, 2008

(54) RADIO ACCESS NETWORK AND OPERATION CONTROL METHOD FOR THE SAME

(75) Inventor: Tsuneyuki Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 1089 days.

(21) Appl. No.: 10/732,371

(22) Filed: Dec. 11, 2003

(65) Prior Publication Data

US 2004/0121805 A1    Jun. 24, 2004

(30) Foreign Application Priority Data

Dec. 12, 2002    (JP) .............................. 2002-360815

(51) Int. Cl.
 *H04B 1/38*   (2006.01)
(52) U.S. Cl. ...................... 455/560; 455/561; 370/349; 370/338; 370/342; 370/329; 709/223; 709/225; 709/226
(58) Field of Classification Search .............. 455/550.1, 455/560, 561; 370/310–350; 709/223, 225, 709/226
See application file for complete search history.

(56) References Cited

U.S. PATENT DOCUMENTS

| 6,684,081 B2 * | 1/2004 | Sarkkinen et al. ........... 455/515 |
| 2002/0024937 A1 | 2/2002 | Barnard et al. |
| 2003/0035423 A1 * | 2/2003 | Beckmann et al. .......... 370/390 |
| 2003/0185190 A1 * | 10/2003 | Chitrapu et al. ............. 370/338 |
| 2004/0102200 A1 * | 5/2004 | Palkisto et al. .............. 455/466 |

FOREIGN PATENT DOCUMENTS

| EP | 1 067 809 A1 | 1/2001 |
| KR | 2002-035177 A | 5/2002 |
| KR | 2002-081840 A | 10/2002 |

OTHER PUBLICATIONS

3GPP TS 25.401 V5.4.0 (Sep. 2002), 3rd Generation Partnership Project; Technical Specification Group Radio Access Network; UTRAN Overall Description (Release 5), © 3GPP Organization Partners.

(Continued)

*Primary Examiner*—Charles N Appiah
*Assistant Examiner*—Olumide T Ajibade Akonai
(74) *Attorney, Agent, or Firm*—Foley & Lardner LLP

(57) ABSTRACT

An RNC is divided into a plurality of user plane servers (UPSs) for executing the transmission control of user's data and a control plane server (CPS) for executing the transmission control of a control signal for transmitting user's data. A C plane control section for executing the transmission control of the control signal for transmitting the user's data is disposed in the CPS, and similarly a U plane control section for executing the transmission control of the user's data is disposed in each of the UPSs. A logical connection for transmitting control information is interposed between the U plane control section and the C plane control section. Hence, such a system, in which both the function of the C plane control and the function of the U plane control in the radio access controller (RNC) are physically divided into a plurality of devices, provides a simple control system, thereby making it possible to rapidly exchange the control information between the protocol entities.

18 Claims, 16 Drawing Sheets

OTHER PUBLICATIONS

J. Kempf et al., "OpenRAN: A New Architecture for Mobile Wireless Internet Radio Access Networks," IEEE Communications Magazine, IEEE Service Center, NY, vol. 40:5, May 2002, pp. 118-123, XP001129447.

N. Musikka et al., "Ericsson's IP-based BSS and radio network server," Ericsson Review, vol. 77:4, 2000, pp. 224-233, XP000969930.

Universal Mobile Telecommunications System (UMTS); UTRAN Overall Description (3GPP TS 25.401 version 5.4.0 Release 5), ETSI TS 125 401; European Telecommunication Standards Institute, Sophia-Antipo, FR. vol. 3-R3, No. V540, Sep. 2002, pp. 1-43, XP014008844.

\* cited by examiner

FIG.4

| REQUEST | COMMAND | PROTOCOL ENTITY | RESPONSE IDENTIFIER | RESPONSE TIME |
|---|---|---|---|---|
| RRC CONNECTION REQUEST | RADIO LINK SETUP REQUEST | PHY | Result-End | 50ms |
| | ALCAP ESTABLISH REQUEST | PHY | Reply | 100ms |
| RADIO LINK SETUP RESPONSE | DHT RESOURCE GET REQUEST | MAC-FP | Reply | 10ms |
| | DHT-NB PATH CONNECT REQUEST | MAC-FP | Result-Soon | 10ms |
| | MSU RESOURCE GET REQUEST | RLC-C | Reply | 10ms |
| | DHT-CL PATH CONNECT REQUEST | RLC-C | Notify | 10ms |
| ... | ... | ... | ... | ... |

FIG. 5

EXECUTION ORDER ↓

```
Commnd-Request1
{
  ProtocolEntity:PHY
  Command:Cell Setup Request
  {
    Parameters
  }
}
Commnd-Request2
{
  ProtocolEntity:PHY
  Command:Common Transport Channel Setup Request(PCH)
}
Commnd-Request3
{
  ProtocolEntity:PHY
  Command:Common Transport Channel Setup Request(FACH)
}
```

RESPONSE ORDER ↓

```
Commnd-Reply1
{
  ProtocolEntity:PHY
  Command:Cell Setup Response
  {
    Parameters
  }
}
Commnd-Reply2
{
  ProtocolEntity:PHY
  Command:Common Transport Channel Setup Response(PCH)
}
Commnd-Reply3
{
  ProtocolEntity:PHY
  Command:Common Transport Channel Setup Response(FACH)
}
```

FIG.7

```
Transaction1
{
   Commnd-Request1
   {
      ProtocolEntity:RLC-C
      ReplyControl:Result
      Command:DCCH Connection Request
   }

Commnd-Request1
   {
      ProtocolEntity:RLC-C
      ReplyControl:Reply
      Command:CRLC Resume Request
   }
}
```

FIG.9

```
Transaction1
{
   Commnd-Request1
   {
      ProtocolEntity:none
      ReplyControl:Notify
      Command:UPS StartIndication
      {
        LocalCell#1,LocalCell#2,Node B#1
      }
   }
}
```

FIG. 10

```
Transaction1
{
  Control1:Node B
  {
    Command-Request1
    {
      ProtocolEntity:PHY
      Command:Cell Setup Request
    }
  }
  Control2:Cell#1
  {
    Command-Request1
    {
      ProtocolEntity:PHY
      Command:Common Transport Channel Setup Req(PCH)
    }
    Commnd-Request2
    {
      ProtocolEntity:PHY
      Command:Common Transport Channel Setup Req(FACH)
    }
  }
}
```

FIG. 12

```
Transaction1
{
  Command-Request A
  {
    ProtocolEntity:none
    Request RRC Connection Request
    {
      Parameters
    }
  }
  Command-Request B
  {
    ProtocolEntity:PHY
    Command:Radio Link Setup Request
    {
      Parameters
    }
  }
  Command-Request C
  {
    ProtocolEntity:PHY
    RequestType:RRC Connection Request
    {
      Keyword:Registration
    }
  }
}
```

FIG.13

| REQUEST IDENTIFIER | KEYWORD | SF | UP-LINK SIR TARGET VALUE | PC ALGORISM |
|---|---|---|---|---|
| RRC CONNECTION REQUEST | Registration | SF1 | SIR1 | ALGORISM 1 |
| RRC CONNECTION REQUEST | AMR | SF2 | SIR2 | ALGORISM 2 |
| RRC CONNECTION REQUEST | PS64K | SF3 | SIR3 | ALGORISM 3 |
| RRC CONNECTION REQUEST | AMR+PS64K | SF4 | SIR4 | ALGORISM 4 |
| RRC CONNECTION REQUEST | ... | ... | ... | ... |
| ... | | | | |

FIG. 15

| REQUEST | FLAG |
|---|---|
| AUDIT REQUIRED INDICATION | Yes |
| RRC CONNECTION REQUEST | No |
| RADIO LINK SETUP RESPONSE | No |
| ... | ... |

FIG. 16

```
Transaction1
{
  Commnd-Request1
  {
    ProtocolEntity:none
    ReplyControl:Notify
    Command:UPS StartIndication
    {
      LocalCell(#1..#8),Node B(#1..#8)
    }
  }
}
```

RADIO ACCESS NETWORK AND OPERATION CONTROL METHOD FOR THE SAME

BACKGROUND OF THE INVENTION

1. Technical Field of the Invention

The present invention relates to a radio access network (RAN) and to an operation control method for the same. In particular, the present invention relates to an improvement of a radio network controller (RNC) in a W-CDMA (Wideband-Code Division Multiple Access) cellular system.

2. Description of the Related Art

FIG. 1 is a block diagram showing the structure of a mobile communication system including a conventional radio access network, i.e., a W-CDMA communication system.

As shown in FIG. 1, a radio access network (RAN) 1 comprises radio network controllers (RNCs) 4, 5 and node B's 6 to 9. The RAN 1 is connected to a mobile equipment (ME) 2 via a Uu interface (radio interface) and to a core network (CN) 3 via an Iu interface, where the CN 3 is an exchanger network providing a circuit exchanging service or packet exchanging service. The interface between one of node Bs 6 to 9 and one of RNCs 4, 5 is called Iub, and the interface between RNCs 4 and 5 is specified by Iur interface. The detail of the system shown in FIG. 1 is defined in 3GPP (Third Generation Partnership Projects) (for example, in 3GPP TS 25.401 V5.4.0 (2002-09), "3rd Generation Partnership Project; Technical Specification Group Radio Access Network; UTRAN Overall Description (Release 5)").

Each of node B's 6-9 means a logical node of carrying out the radio transmission/reception, and more specifically it is a radio network device. Each node B 6-9 covers one or more cells 10, and it is connected to the mobile equipment (ME) 2 via the radio interface Uu, so that the radio link ends thereat.

An RNC is capable of controlling a plurality of radio networks, and serves managing the radio resources as well as controlling the hand-over. More specifically, RNC 4 and 5 perform the management of node B's 6-9 and the selection/synthesis of a radio path in the case of a soft hand-over. The structural arrangement of the RNC is formed in a unit by physically combining a function for controlling C (Control) plane as a protocol for signaling in the transmission of a control signal with a function for controlling U (User) plane as a protocol for transmitting user's data regarding the mobile equipment (ME) 2.

A signal is exchanged between ME 2 and CN 3 via the C (control) plane of the protocol for signaling in the transmission control of the control signal and the U (User) plane of the protocol for transmission control of the user's data. In this case, the C plane control function and the U plane control function, except the physical layer (PHY), are physically realized on an RNC.

In such a radio access network including the conventional RNC in which the C plane control function and the U plane control function are unified, it is necessary to include RNC itself in order to enhance the process rate for signaling, although, in this case, it is normally sufficient to add only the C plane control function thereto. Moreover, it is necessary to include RNC itself in order to enhance the transmission rate of user's data, although, in this case, it is normally sufficient to add only the U plane control function thereto. Accordingly, it is difficult to provide a system having both an excellent scalability and flexibility in the conventional RNC.

In view of these facts, an approach to separate the C plane control function from the U plane control function in the RAN has been made, so that it is proposed that a C plane control device for controlling the C plane and a U plane control device for controlling the U plane are physically separated from each other and disposed as independent units. In this structural arrangement, it is sufficient to additionally include only the C plane control device when the process ability for signaling is enhanced, and it is sufficient to additionally include only the U plane control device, when aiming to enhance the rate for transmitting the user's data. Thereby, a system having a satisfactory scalability can be realized. In an actual system, various arrangements are conceivable, for example, it is possible to assign n U plane control devices to a C plane control device, or to assign m U plane control devices to n C plane control devices. Moreover, in the case when m U plane control devices is assigned to n C plane control devices, it is possible to subordinate more than two C plane control device to a U plane control device.

For instance, in Japanese Patent Application No. 2002-185417, the present inventors have proposed a method for providing C plane information to ME, using a radio bearer controlled by a U plane control device, wherein a C plane control device for controlling the C plane is physically separated from the U plane control device for controlling the U plane, and a logical connection is interposed between the C plane control device and the U plane control device. This application is not yet published at present.

When, however, a C plane control device is physically separated from a U plane control device in a radio access network, the exchange of control information between protocol entities, which is closed so far inside the RNC, is carried out between various devices, so that the exchange of control information takes a lot of time and a complicate control system is further required to exchange the control information. For instance, when an ME is in the soft hand-over state, the setup of a new radio linkage and the release of the connected radio linkage cannot be carried out quickly, thereby causing the user's communication to be interrupted in an increased possibility.

SUMMARY OF THE INVENTION

Accordingly, it is an object of the present invention to provide a radio access network, which ensures a rapid exchange of control information between protocol entities without any usage of a complicate control system wherein the C plane control function and U plane control function are separated from each other and are disposed in a plurality of devices.

It is another object of the present invention to provide an operation control method for such a radio access network, wherein the control can be carried out rapidly and efficiently.

The above objects are attained by the following measures:

In accordance with an aspect of the invention, a radio access network (RAN) includes a radio network controller (RNC) consisted of a plurality of user plane servers (UPSs) for executing the transmission control of user's data regarding a mobile equipment (ME) and a control plane server (CPS) for executing the transmission control of a control signal for transmitting the user's data, wherein each of the UPSs includes at least one of protocol entity for executing the transmission control of user's data regarding ME and U plane control section, wherein the CPS includes at least one of protocol entity for executing the transmission control of a control signal for transmitting the user's data and the C plane control section, and wherein a logical connection for transmitting control information is associated between the U plane control section and the C plane control section, in which case, the U plane control section and the C plane control section communicates with each other.

In a radio access network according to the invention, the control information includes preferably at least one of more than one control command including a protocol entity identifier for uniquely identifying a protocol entity to be controlled between UPS and CPS and more than one confirmation response command for the control command, wherein each of the C plane control section and the U plane control section includes preferably a first table in which a one to one correspondence is given between a received request and a set of a response method for the protocol entity to be controlled and the control command and the response time, wherein one of the C plane control section and the U plane control section generates the control information, referring to the first table, and sends the same to the other of the C plane control section and the U plane control section, whereas the other of the C plane control section and the U plane control section extracts a set of the protocol entity identifier and the control command from the received control information, and distributes the extracted control command to the respective protocol entities included in the received control information, and further generates control information from the confirmation response received from the respective protocol entities and then sends the same as a reply to the one of the C plane control section and the U plane control section.

In another aspect of the invention, an operation control method in a radio access network including a radio network controller (RNC), a plurality of radio networks, mobile equipments (MEs) each included in a cell governed under each of the radio networks, wherein the RNC is composed of a plurality of user plane servers (UPSs) each having at least one of protocol entity for executing the transmission control of user's data regarding ME and a control plane server (CPS) having at least one of protocol entity for executing the transmission control of a control signal for transmitting the user's data, wherein the control information includes at least one of more than one control command including a protocol entity identifier for uniquely identifying a protocol entity to be controlled between UPS and CPS and more than one confirmation command for the control command, wherein each of UPS and CPS has a first table in which a received request and a set of the protocol entity to be controlled, a response method to the control command and the response time is assigned to each other in a one to one correspondence, and wherein the operation control method comprising the steps: providing a logical connection for sending the control information between UPSs and CPS to execute the communication therebetween; generating the control information by one of UPS and CPS, referring to the first table to send the same to the other of UPS and CPS; extracting a set of a protocol entity identifier and a control command from the received control information to distribute the control command thus extracted to the respective protocol entities included in the received control information; and generating control information from the confirmation response received from the respective protocol entities to send the same as a reply to the other of UPS and CPS.

In accordance with the present invention, the radio access network and the operation control method proposed herein provide a simple control system, thereby making it possible to rapidly exchange the control information between protocol entities.

Further objects, features and advantages of the present invention will become apparent from the following description of the preferred embodiments with reference to the accompanying drawings.

BRIEF DESCRIPTION OF THE DRAWINGS

FIG. 4 is a diagram showing an example of the content of a first table;

FIG. 5 is a diagram showing an example of control information;

FIG. 7 is a diagram showing an example of control information;

FIG. 9 is a diagram showing an example of control information;

FIG. 10 is a diagram showing an example of control information;

FIG. 12 is a diagram showing an example of control information;

FIG. 13 is a diagram showing an example of the content of a second table;

FIG. 15 is a diagram showing an example of the content of a third table;

FIG. 16 is a diagram showing an example of control information; and

THE PREFERRED EMBODIMENTS OF THE INVENTION

Figure 2:
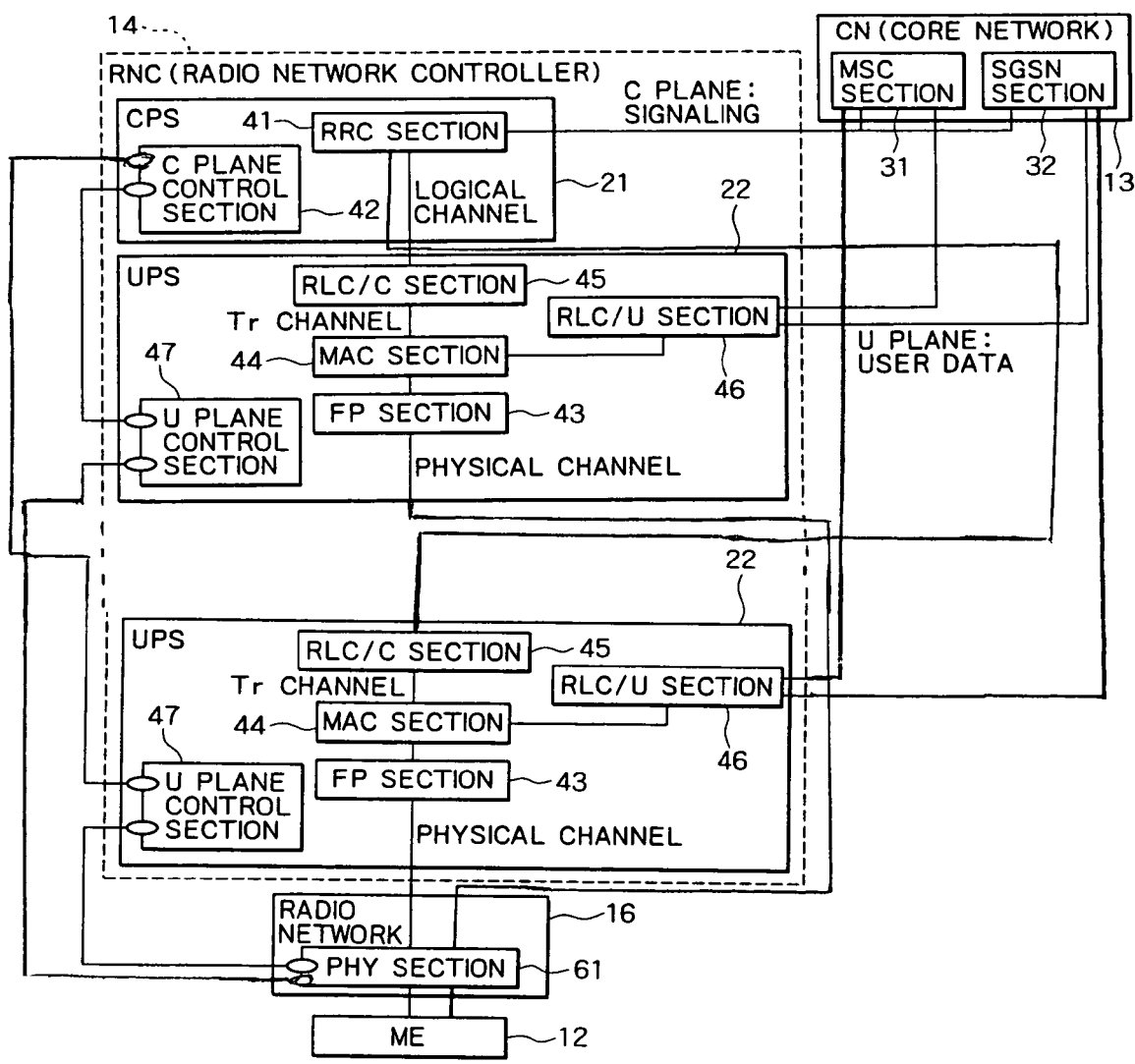
FIG. 2 is a block diagram showing the structure of a mobile communication system including a radio access network in a first embodiment of the invention.

Referring now to the accompanying drawings, the preferred embodiments of the present invention will be described. FIG. 2 is a block diagram showing the structure of a mobile communication system, which includes a radio access network according to a first embodiment of the invention.

Figure 1:
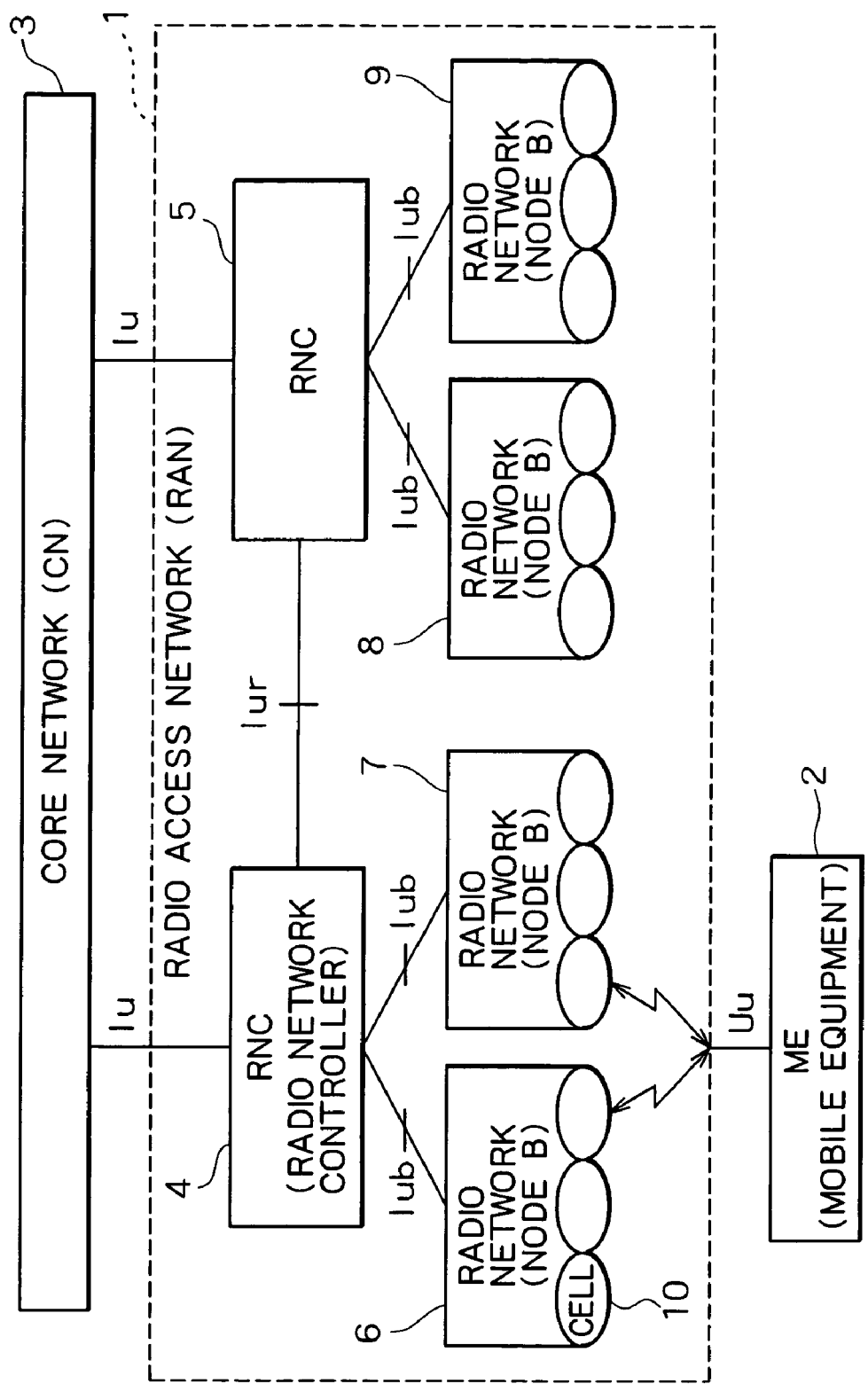
FIG. 1 is a block diagram showing the structure of a W-CDMA communication system which is a mobile communication system including a conventional radio access network.

Similarly to the conventional system shown in FIG. 1, a mobile communication system according to the invention comprises a radio network 16 connected to a mobile equipment (ME) 12, a radio network controller (RNC) 14 for managing a radio resource to control the hand-over by controlling the radio network 16, and a core network (CN) 13 connected to the RNC 14 for providing the circuit exchange service and/or the packet exchange service. A radio access network (RAN) comprises the RNC 14 and the radio network 16. In FIG. 2, only an RNC 14, a radio network 16 and an ME 12 are represented. Generally, RNCs, radio networks and MEs are employed in a mobile communication system. Specifically, RNCs 14 are connected to the CN 13 and the radio networks 16 are connected to each RNC 14, and generally a plurality of MEs 12 exists in a cell which each radio network 16 governs.

In the first embodiment, RNC 14 is divided into a plurality of user plane servers (UPSs) 22 for executing the transmission control of user's data regarding ME 12 and a control plane server (CPS) 21 for executing the transmission control of a control signal for transmitting the user's data. The CPS 21 has a function of generating a radio resource control (RRC) message in a RRC layer serving as a superordinate layer to each UPS 22 and ends thereat. An RRC section 41 is disposed therein to generate the RRC message and to terminate the transmission. On the other hand, each UPS 22 has a function of controlling a layer of a media access control (MAC) +frame protocol (FP) and a radio link control (RLC) layer. In order to realize such a function, each UPS 22 is equipped with an FP section 43 for controlling the FP layer; an MAC section 44 for controlling the MAC layer; an RLC/C section 45 for controlling a part regarding the C plane in the RLC layer; and an RLC/U section 46 for controlling a part regarding the U plane in the RLC layer. Each radio network 16 has a function for controlling a physical (PHY) layer so that it has a PHY section 61 for executing the control. A core network (CN) 13 is equipped with a mobile switching center (MSC) 31 having the circuit switching function and a serving GPRS (Global Packet Radio Service) switching node (SGSN) 32 having the packet exchanging function.

Thus, the mobile communication system is constituted by the PHY layer, FP layer, MAC layer and RLC layer in the sequence from the subordinate layer to the superordinate layer, as shown in FIG. 2. In the present invention, an entity for controlling the function of each layer is called a protocol entity. In other words, the protocol entity is a general term as to the RRC section 41, FP section 43, MAC section 44, RLC/C section 45, RLC/U section 46 and PHY section 61. The protocol entity in the CPS 21 mainly executes the transmission control of a control signal for transmitting user's data, and the protocol entity in the UPS 22 mainly executes the transmission control of user's data.

Moreover, in conjunction with the fact that RNC 14 is constituted by CPS 21 and a plurality of UPSs 22, the CPS 21 is equipped with a control (C) plane control section 42 for executing the transmission control of a control signal for transmitting the user's data, and similarly each UPS 22 is equipped with a user (U) plane control section 47 for executing the transmission control of user's data regarding the ME 12. A logical connection for transmitting control information is interposed between the U plane control section 47 and the C plane control section 42. The control information to be exchanged between CPS21 and UPS 22 is transmitted via the logical connection. As will be described below, the control information includes more than one control command, in which a protocol entity identifier for uniquely identifying the protocol entity to be controlled between UPS and CPS is included. The control information also includes more than one confirmation response command for the control command.

In the following, the fundamental functions of the U plane control section 47 and the C plane control section 42 will be described. Each of the U plane control section 47 and the C plane control section 42 includes a first table in which a one to one correspondence is given between a request from the ME 12, radio network 16 or CN 13 and a set of a method for replying the protocol entity to be controlled and control command and the reply time. One of the U plane control section 47 and the C plane control section 42 is constituted such that it generates a control information, referring to the first table, and it transmits the information to a corresponding control section (the other of the U plane control section 47 and the C plane control section 42), and further such that it extracts a set of the protocol entity identifier and control command from the received control information, and then distributes a control command to each protocol entity included in the control information. Moreover, one of the U plane control section 47 and the C plane control section 42 is constituted such that it generates control information from the confirmation reply of the control command received from the respective protocol entities, and then sends the same as a reply to the other of the U plane control section 47 and the C plane control section 42.

As described above, the logical connection for transmitting control information is interposed between the U plane control section 47 and the C plane control section 42, so that information for controlling the protocol entity is sent/received via the logical connection. Moreover, information for controlling a node B application part (NBAP) signaling between the RNC 14 and the radio network 16 and an access link control application protocol (ALCAP) is transmitted from the PHY section 61 in the radio network 16 via the U plane control section 47.

In this case, a physical channel is interposed between the PHY section 61 in the radio network 16 and the FP section 43 in the UPS 22, and a transport (Tr) channel is interposed between the MAC section 44 and RLC/C section 45, and further a logical channel is interposed between RLC/C section 45 and the RRC section 41 in the CPS 21. Regarding the signaling of RRC between ME12 and RNC 14, a function provided from MAC+FP and RLC layers is used in the UPS 22, and then the signal is transmitted to the ME 12 and RRC section 41 in the CPS 21.

The signaling between RNC 14 and MSC 31 as well as between RNC 14 and SGSN 32 is treated as the C plane signaling in CPS 21 and terminated thereat. Moreover, the user's data are sent/received as the U plane user data between the ME 12 and MSC 31 or SGSN 22.

Furthermore, in the mobile communication system, it is possible to include more than one control command arranged in the sequence of control in the control information. In this case, one of the U plane control section 47 and the C plane control section 42 sequentially extracts a set of the protocol entity identifier and control command from the received control information, and then sends a control command to the respective protocol entities included in the extracted control information in the sequence of extraction. Moreover, the one of the U plane control section 47 and the C plane control section 42 rearranges the confirmation responses received from the respective protocol entities for the control command in a sequence of extracting the control commands and generates the control information, and then sends the control information to the other of the U plane control section 47 and the C plane control section 42.

Figure 3:
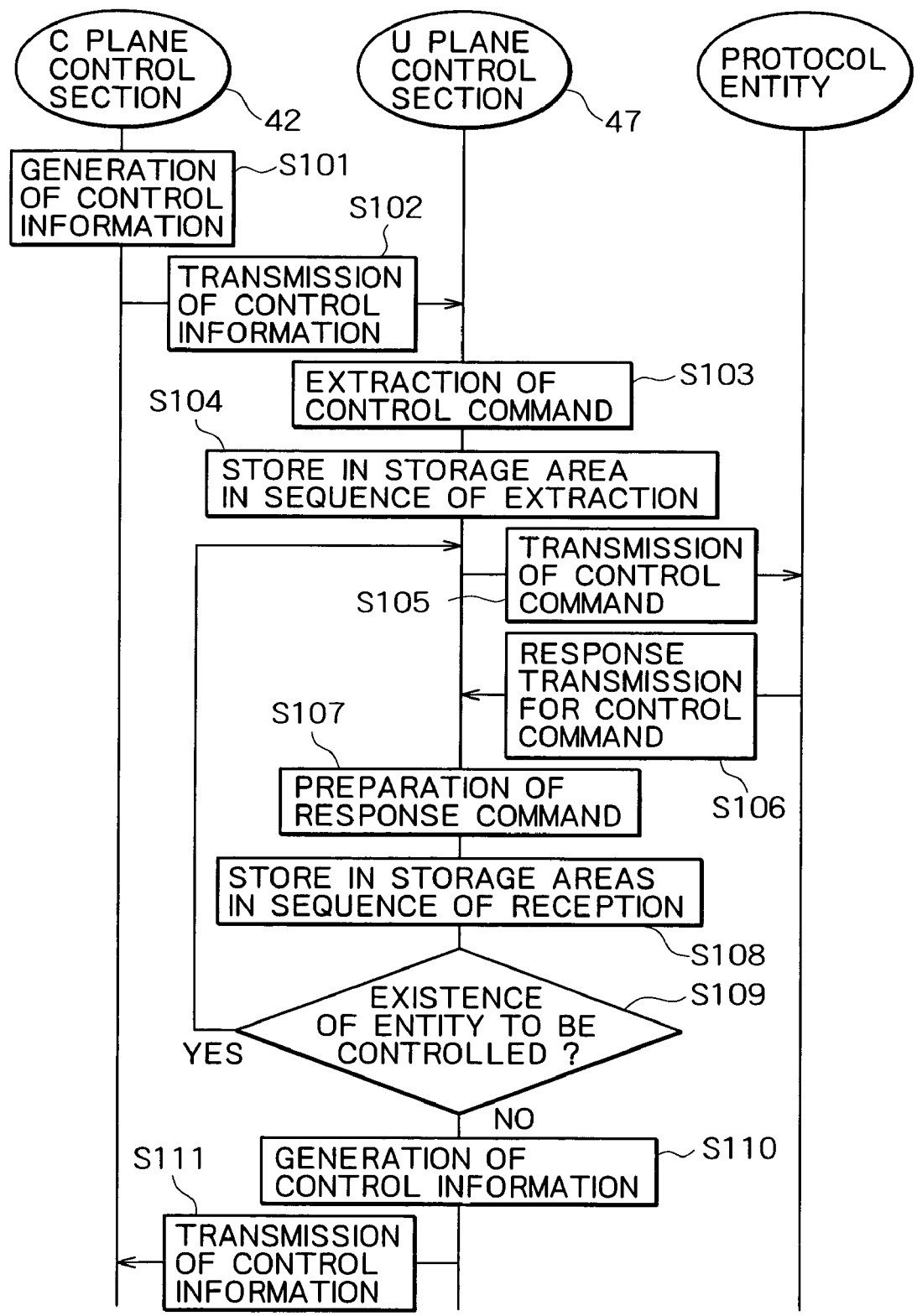
FIG. 3 is a flow diagram showing the process in the first embodiment.

In the following, referring to FIGS. 3, 4 and 5, the operation control of the radio access network in the mobile communication system will be described. FIG. 3 is a flow diagram showing the flow of process between the U plane control section 47 and the C plane control section 42, and FIG. 4 is a diagram showing the content of the first table in which a one to one correspondence between the request from the ME 12, radio network 16 or CN 13 and a set of a reply method to the control command, reply identifier and response time is given. Moreover, FIG. 5 shows an example of the control information.

The C plane control section 42 generates control information in accordance with the request from the ME 12, radio network 16 or CN 13, with reference to the first table shown in FIG. 4 (step S101), and then sends the control information thus generated to the U plane control section (step S102). In this case, each of the U plane control section 47 and the C plane control section 42 includes the first table, and the first table in the U plane control section 47 is referred to, when a control command is sent from the U plane control section 47. The first table can also be used commonly for a C plane control section 42 and a plurality of the U plane control sections 47.

As shown in FIG. 5, in the control information, a protocol entity identifier (starting at "Protocol Entity"), a command name (for example, cell setup request (Cell Setup Request)), a common transport channel setup request (Common Transport Channel Setup Request) & command identifier (starting in "Command:"), and more than one control command composed of no or more than one information element (Parameters) as an argument for the command are arranged in the sequence of control. At the top of each control command, "Command—" is disposed to identify the control command.

The U plane control section 47 extracts a set of a protocol entity identifier and a control command in a predetermined sequence from the received control information (step S103), and stores the same into a storage area in the sequence of extraction (step S104), and then sends the control command to the protocol entity initially extracted (step S105), and waits for the response from the protocol entity.

Thereafter, the U plane control section 47 receives the reply to the control command from the protocol entity (step S106), and then generates a response command comprising a protocol entity identifier, a command name (for example, Cell Setup Response), a common transport channel setup response (Common Transport Channel Setup Response) & command identifier and the content of the received response (step S107), and thus stores the response command in a storage area pertaining to the U plane control section 47 in the sequence of reception (step S108). Thereafter, the U plane control section 47 searches for a protocol entity to be subsequently controlled from the storage area (step S109). When such a protocol entity identifier exists in the storage area, it goes to step S105. In step S109, when no such protocol entity identifier exists in the storage area, the U plane control section 47 generates control information from the response command stored in the storage area (step S110), and then sends the control information to the C plane control section 42 (step S111), and finally ends the process.

In this case, it is assumed that the protocol entity identifier, the command identifier, the existence/non-existence of an information element, the content of the information element, and the content of the response are specified beforehand between UPS 22 and CPS 21, and therefore can be uniquely identified. For the purpose of simplicity, the procedure is described only in the case when the control command is sent from the C plane control section 42. However, a similar process can be carried out in the case when the control command is sent from the U plane control section 47, thereby making it possible to obtain an effect similar to the procedure in the case when the control command is sent from the C plane control section 42.

As described above, in the first embodiment, the following technical concept is used: In the radio access network (RAN) wherein the C plane control function and U plane control function are physically separated from each other, as CPS 21 and UPS 22, respectively, the CPS 21 is equipped with the C plane control section 42, and the UPS 22 is equipped with the U plane control section 47, and further a logical connection (link) is interposed between the control sections 42 and 47 to exchange the control information via the link; and the response can be executed, referring to the first table in which operations for the commands included in the control information are listed, thereby enabling the control information to be quickly exchanged. If the RAN does not include both the C plane control section 42 and the U plane control section 47, independent control paths (links) extend respectively between CPS 21 and each of protocol entities (FP section 43, MAC section 44, RLC/C section 45, RLC/U section 46 and PHY section 61) in UPS 22 and/or the radio network 16. As a result, the structure of the control system becomes complicate, thereby causing a quick response to be hindered.

The first embodiment of the invention is elucidated in the above description. However, the present invention is not restricted to the above. Various features can be provided. In the following, embodiments of the invention will be described.

In a radio access network according to a second embodiment of the invention, a response identifier is included, adding to the control command. As a result, one of the U plane control section 47 and the C plane control section 42 extracts a set of a protocol entity identifier, a response identifier and a control command from the received control information, and stores a set of the protocol identifier and response identifier thus extracted in the storage areas of the control sections 47 and 42. Then, the one of the U plane control section 47 and the C plane control section 42 sends the control command to the respective protocol entities included in the control information in the sequence of extraction, and furthermore generates control information from the confirmation response received from the respective protocol entities to the control command in accordance with the response identifier extracted, and finally sends the control command to the other of the U plane control sections 47 and the C plane control section 42.

Moreover, a system can be employed in which the control information is uniquely identified on the basis of a transaction identifier between UPS 22 and CPS 21. In this case, the control information includes the transaction identifier and more than one control command, so that one of the U plane control section 47 and the C plane control section 42 again send a transaction, when it receives no response to the transaction from the corresponding control sections within a re-sending time interval after sending the transaction. It is preferable that the one of the U plane control section 47 and the C plane control section 42 determines the time of resending the transaction in accordance with the sum of the time of the reciprocating transmission and the response time for each control command.

Figure 6:
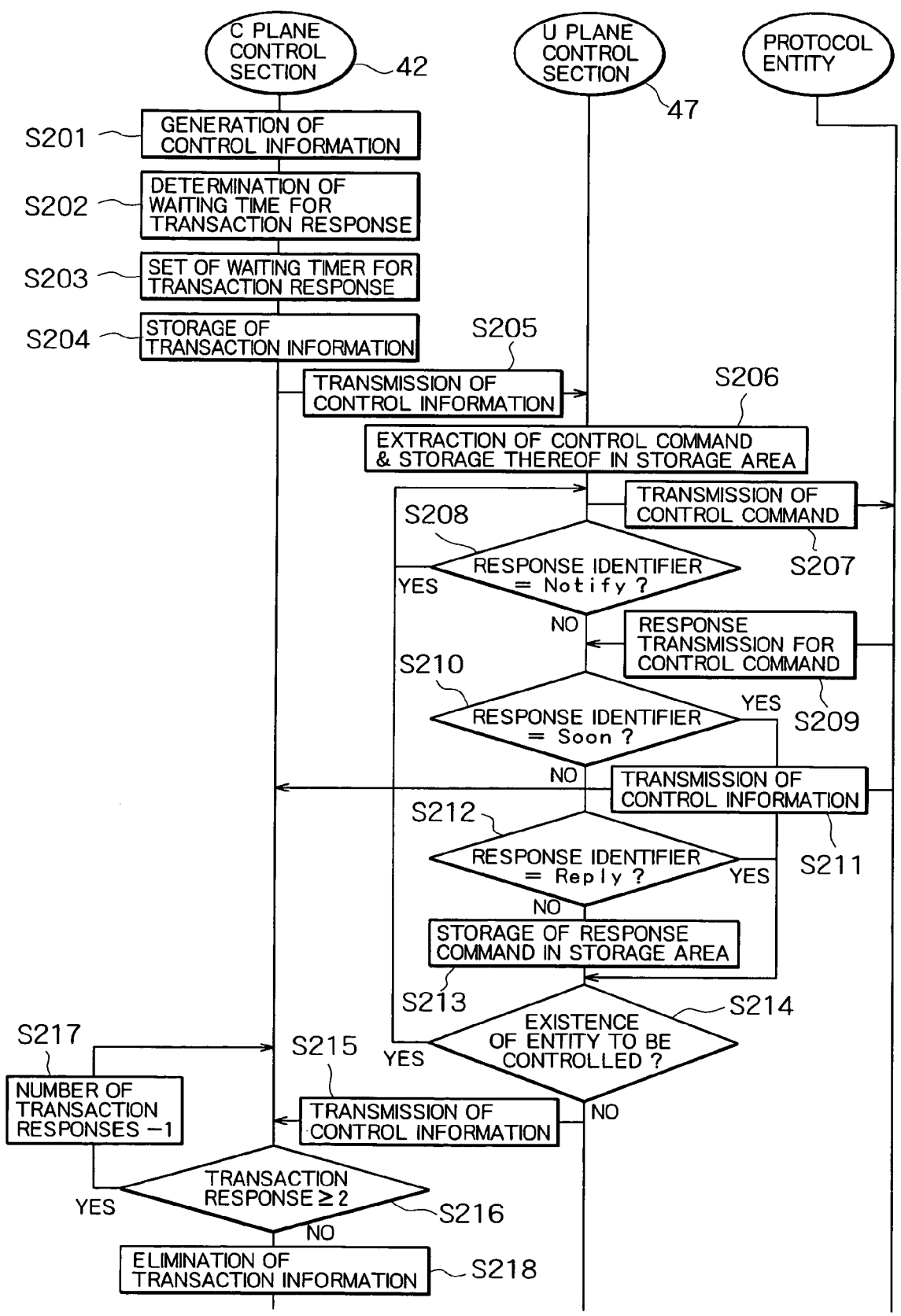
FIG. 6 is a flow diagram showing the process in a second embodiment.

In the following, the function of the radio access network in the second embodiment will be described. FIG. 6 is a flow diagram showing the processes executed between the U plane control section 47 and the C plane control section 42, and FIG. 7 shows an example of the control information.

Firstly, the C plane control section 42 receives a transaction identifier in response to the request from the ME 12, radio network 16 or CN 13, and generates control information, referring to the first table (see FIG. 4) (step S201). Thereafter, the C plane control section 42 determines the time of waiting the transaction response from the sum of the reciprocating transmission time for sending data having an arbitrary size to UPS 22 and the response time for each control command in the first table (step S202), and sets a timer for waiting the transaction response, which starts to operate after the time of waiting the transaction response (step S203). Moreover, the C plane control section 42 stores the transaction information in the storage area of the C plane control section 42 by assigning a transaction identifier and the number of responses to each other (step S204), and then sends the control information generated to the U plane control section 47 (step S205).

In the control information, more than one control command composed of a transaction identifier (staring at "Transaction"), a protocol entity identifier, a response identifier (starting at "Reply Control"), a command name or command identifier and either no or more than one information element as an argument of command is arranged in the sequence of control, as shown in FIG. 7.

The response identifier is used to identify, for example, the following statuses: (1) returning a transaction response including a response command after all of the control commands in the transaction are processed (Result-End); (2) returning the transaction including a response command in the timing of the processed control command (Result-Soon); (3) generating no response command, although the response from the protocol entity is confirmed (Reply); and (4) no need to response from the protocol entity (Notify). The number of transaction responses returned to transaction is identical to the number of statuses "Result-Soon" when the last response identifier is "Result-Soon", whereas it is identical to the number of statues "Result-Soon" plus 1 except for the above case.

The U plane control section 47 extracts a set of the protocol entity identifier and control command in a predetermined sequence from the above-described control information, and stores the same in the storage area of the U plane control section 47 (step S206), and sends the control command to the protocol entity initially extracted (step S207), and then confirms the response identifier (step S208). If the response identifier is "Notify", the U plane control section 47 goes to the step S207, and otherwise waits for the response from the protocol entity.

Thereafter, the U plane control section 47 receives a response to the control command from the protocol entity (step S209), and confirms as to whether or not the response identifier is "Result-Soon" (step S210), and goes to step S211 in the case when the response identifier is "Result-Soon". When the case is not so in Step 210, the U plane control section 47 goes to step S212. In step S211, the U plane control section 47 generates control information from the content of the received response, and sends the control information to the C plane control section 42, and then goes to step S214. In step S212, the U plane control section 47 confirms as to whether or not the response identifier is "Reply". When the response identifier is "Reply", the control section goes to step S214. However, when the response identifier is not "Reply", the U plane control section 47 stores the generated response command in the storage area (step S213), and then goes to step S214.

In step S214, the U plane control section 47 searches for the protocol entity to be subsequently controlled in the storage area. When such a protocol entity identifier exists in the storage area, the control section returns to the step S207. However, when such a protocol entity identifier does not in the storage area, the U plane control section 47 generates the control information from the response command stored so far in the storage area, and sends the control information to the C plane control section 42 (step S215).

The C plane control section 42 tries to confirm the number of transaction responses (step S216). When the number of transaction responses is greater than 2, the C plane control section 42 waits for the next transaction response by subtracting 1 from the number of transaction responses (step S217). On the other hand, when the number of transaction responses is not greater than 2, the C plane control section 42 ends the process by eliminating the transaction identifier and the number of the transaction responses from the storage area (step S218).

For the waiting of the transaction response, if a timer for waiting the transaction response starts to operate, that is, in the case of time out, the transaction is resent by repeating the process from step S201. Otherwise, when it is assumed that a transmission path between CPS 21 and UPS 22 is surely reliable, the transaction is not sent and an abnormal process is carried out. It is also conceivable that the time of waiting for the next transaction response can be increased by increasing the reciprocating transmission time set between CPS 21 and UPS 22.

In this case, it is assumed that the transaction identifier and response identifier are predetermined in the system, and can be uniquely identified. For the sake of simplicity, the operation in which the control command is sent from the C plane control section 42 is exclusively described. A similar operation, in which the control command is sent from the U plane control section 47, can be carried out, and an effect similar to that in the case when the control command is sent from the C plane control section 42 can be obtained.

In the following, a third embodiment of the present invention will be described. In the third embodiment, adding to those in the first or second embodiment, a transaction identifier, more than one control object identifier for uniquely identifying the control object (ME 12, radio network 16 and cells governed under the radio network) in the protocol entity between UPS 22 and CPS 21 and a set of more than one control command are included in the control information. In this case, the U plane control section 47 acquires a control object identifier in the timing of UPS 22 started, and stores the control object identifier and the resource managed by UPS 22 in a storage area by assigning them to each other, and then sends the control information including all of the control object identifiers to the C plane control section 42. Moreover, the C plane control section 42 stores the control object identifier included in the received control information and the resource managed by CPS 21 in a storage area of the C plane control section 42 by assigning them to each other. Furthermore, the C plane control section 42 and the U plane control section 47 are designed such that they search for the control object identifier identical with the control object identifier included in the received request in the storage area and they assemble the control command in a unit of the control object identifier, referring to the request and the first table to generate the control information, and finally send the control information to the corresponding control sections.

Figure 8:
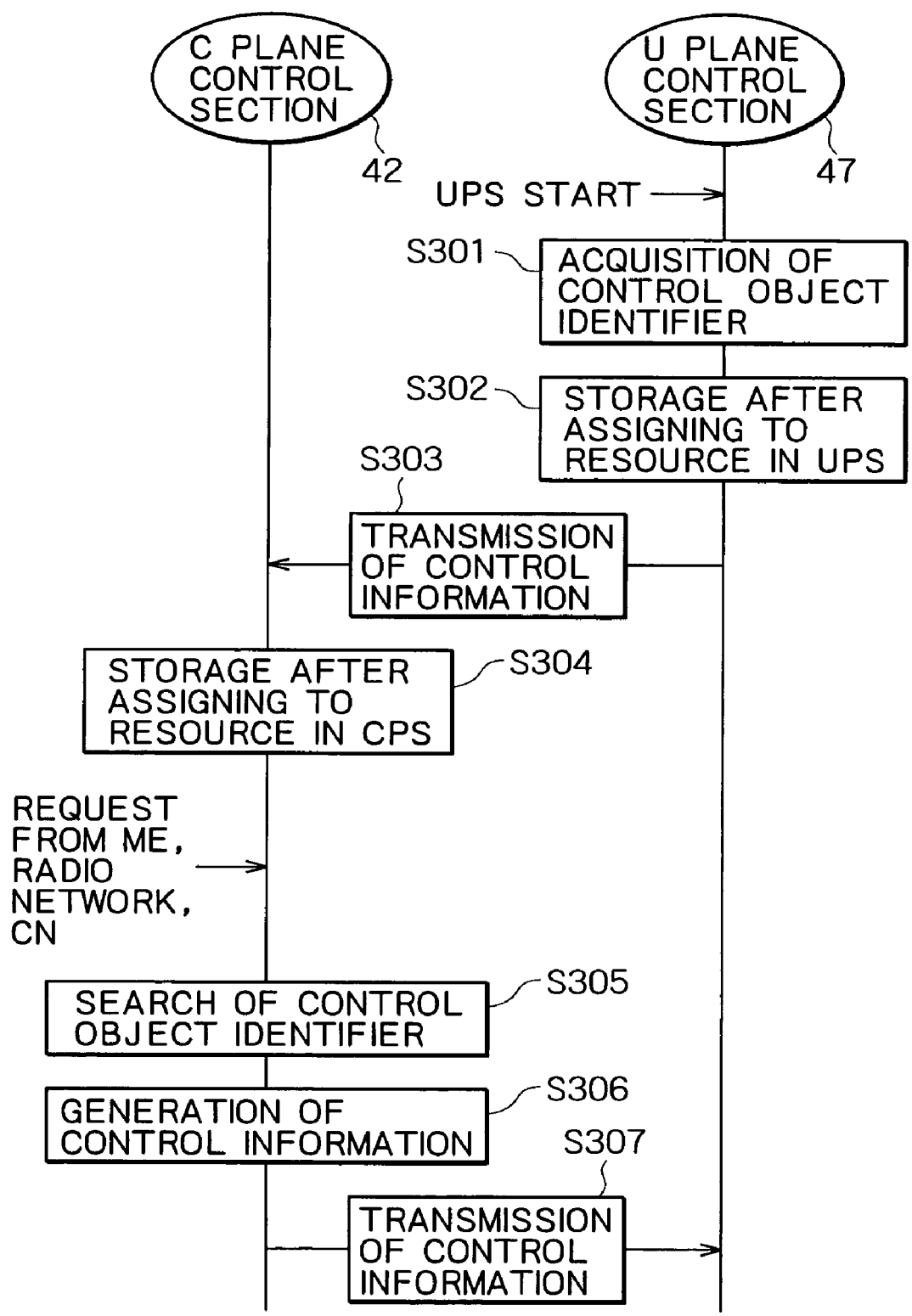
FIG. 8 is a flow diagram showing the process in a third embodiment.

In the following, the function of the radio access network in the third embodiment will be described. FIG. 8 is a flow diagram showing the process executed between the U plane control section 47 and the C plane control section 42, and FIG. 9 shows an example of control information in the case when the U plane control section 47 sends the acquired control object identifier. FIG. 10 shows an example of control information in the case when the C plane control section 42 sets the radio network and the cell just after starting UPS.

The U plane control section 47 acquires the control object identifier for identifying the control object of a protocol entity in the timing of the UPS starting (step S301), and stores the resource managed by UPS 22 and resource identifier for identifying the resource in the storage area after assigning them to each other (step S302). Moreover, the U plane control section 47 sends the control information including all of the acquired control object identifiers to the C plane control section 42 (step S303). An example of the control information in this case is shown in FIG. 9. The control information shown in FIG. 9 includes the transaction identifier, protocol entity identifier (in this case, "None" is set because no protocol entity is specified), response identifier, command name and command identifier (in this case, UPS Start Indication), and further "Local Cell #1, Local Cell #2, Node B #1" are specified as a resource identifier.

The C plane control section 42 stores the control object identifier included in the received control information and the resource managed by CPS 21 in a storage area after specifying them to each other (step S304). Thereafter, the C plane control section 42 searches from the storage area for the control object identifier which is identical to the control object identifier included in the request, in accordance with the request from ME 12, radio network 16 or CN 13 (step S305), and assembles the control command in the unit of a control object identifier to generate the control information (step S305), and then sends the generated control information to the U plane control section 47 (step S307). An example of the control information in this case is shown in FIG. 10. In the control information, "Cell #1" is specified as a resource identifier.

As shown in FIG. 1 and as is also described above, the protocol entity in the UPS 22 provides a logical channel, transport channel and physical channel to the entities in the subordinate layer, and executes the selection and/or setting of the channels in accordance with the performance and characteristic of the signal to be transmitted and the content of the information to be transferred. In these channels, there exist a common channel assigned in a unit of cell governed under the radio network and individual channels assigned in a unit of ME 12 connected to the radio access network (RAN). The protocol entity in the radio network 16 executes the control of the radio linkage between the radio network 16 and ME 12, and has a function for setting the radio network 16. Accordingly, the objects controlled by the protocol entity are the ME 12, the radio network 16 and the cells governed under the radio network. In order to identify the control objects, in this embodiment, UPS 22 acquires the control object identifier in a unit of the ME 12, the radio network 16 and the cell governed under the radio network, and stores a resource to be managed by the UPS 22 and a resource identifier to be identified (for example, Local Cell #1, Local Cell #2, ... Node B #1, ... and others) after assigning them to each other. Furthermore, the resource, which the CPS 21 manages, is a resource which all of the UPSs 22 governed under the CPS 21 manage, and stores a resource to be managed and a resource identifier to be identified (for example, Cell #1, Cell #2, ... Node B #1, ... and others) after assigning them to each other. Thereby, each of the C plane control section 42 and the U plane control section 47 is capable of generating the control information from the control object identifier included in the request from the ME 12, the radio network 16 or the CN 13.

In the description of the third embodiment, for the sake of simplicity, the operation after starting UPS 22 is exclusively described. However, a similar procedure can also be applied to that after starting CPS 21, and the above-mentioned effect can be obtained even in such a case.

In the following, a fourth embodiment of the invention will be described. In this embodiment, either a set of a request, command name and command identifier and information element or a set of information element keyword and request identifier for uniquely identifying the request between UPS 21 and CPS 22, or a combination thereof is included in the control command for each of the above-described embodiments. Moreover, a second table is provided in at least one of the U plane control section 47 and the C plane control section 42. In this case, the second table provides a one to N correspondence between an information element and a set of a request identifier and information element keyword. The control section (at least one of the U plane control section 47 and the C plane control section 42) including the second table is constituted such that it extracts the request identifier and the information element keyword from the control command to generate a control command, and then sends the control command to the respective protocol entities.

Figure 11:
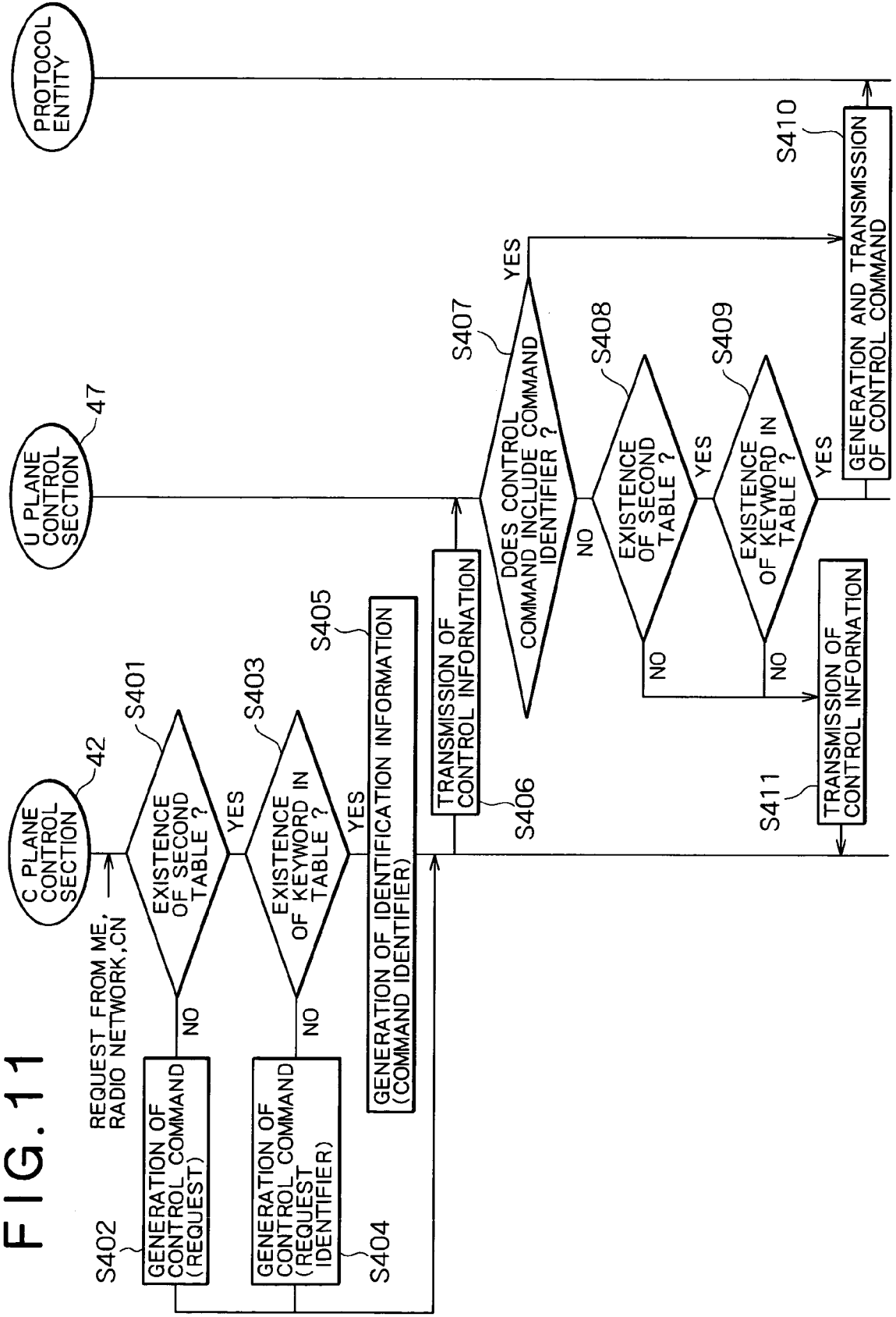
FIG. 11 is a flow diagram showing the process in a fourth embodiment.

In the following, a fourth embodiment of the invention will be described. FIG. 11 is a flow diagram showing a process executed between a U plane control section 47 and a C plane control section 42. FIG. 12 shows an example of control information, and FIG. 13 shows an example of the content of a second table.

In accordance with a request from a ME 12, a radio network 16 or a CN 13, the C plane control section 42 examines as to whether or not the second table is included in the C plane control section 42 itself (step S401). In the case when the second table is not included, the C plane control section 42 generates control information in which a request is included (step S402), and goes to step S406. However, in the case when the second table is included, the C plane control section 42 searches for the information element keyword included in the request, referring to the second table (step S403). In this case, if the information element keyword is not included, the C plane control section 42 generates control information including a set of the request identifier and the information element keyword (step S404), and goes to step S406. If, however, the information element keyword is included in step S403, the C plane control section 42 generates control information including a set of a command identifier and the information element keyword, referring to the first table (step S405), and sends the control information to the U plane control section 47 (step S406).

In the fourth embodiment, as shown in FIG. 12, the control command is one of the followings or a combination thereof: (1) the request from ME 12, radio network 16 or CN 13; (2) a set of the information element and the command name and command identifier; (3) a set of the request identifier for identifying the request and information element keyword. An example of the content of the second table is shown in FIG. 13, and an SF, up-link SIR target value, and PC algorithm are included therein as the information element.

Subsequently, the U plane control section 47 firstly confirms as to whether or not the received control command includes the command identifier (step S407). When the command identifier is included, the U plane control section 47 goes to step S411. When, however, the command identifier is not included, the U plane control section 47 further examines as to whether or not the second table is included in the U plane control section 47 itself (step S408). When the second table is not included, the U plane control section 47 goes to step S410. When the second table is included, the U plane control section 47 searches for the information element keyword included in the request, referring to the second table (step S409). If the information element keyword is not included, the U plane control section 47 generates control information including error information, and then sends it to the C plane control section 42 (step S410). If, however, the information element keyword is included therein in step S409, the U plane control section 47 generates a control command including a set of a command identifier and information element, referring to the first table, and then sends the control command to a protocol entity (step S411).

In the above description, for the sake of simplicity, the operation in the case, in which the control command is sent from the C plane control section 42, is exclusively described. In the case when a control command is sent from the U plane control section 47, the operation is carried out by a similar procedure, an effect similar to that in the case, in which the control command is sent from the C plane control section 42, can be obtained. When, moreover, an owner having the second table is predetermined in the mobile communication system, the step for searching the existence of the second table can be omitted.

In the following, a fifth embodiment of the invention will be described. In the fifth embodiment, adding to the operation in the third or fourth embodiment, the U plane control section 47 acquires a control object identifier in a continuous value by the timing of the UPS 22 starting, and the C plane control section 42 assigns the control object identifier included in the received control information and the resource managed by CPS 21 to each other, and classifies it in an UPS unit, and then stores them in a storage area of the C plane control section 42. In this case, the U plane control section 47 and the C plane control section 42 includes a third table in which a one to one correspondence is given between a request and a flag representing whether or not the control in package is carried out in a UPS unit. Then, one of the U plane control section 47 and the C plane control section 42 searches from the storage area a UPS unit group including the control object identifier which is identical to the control object identifier included in the request, and generates control information by assembling control command from the request by the UPS group unit, and then sends the control information thus generated to the other of the U plane control section 47 and the C plane control section 42.

Figure 14:
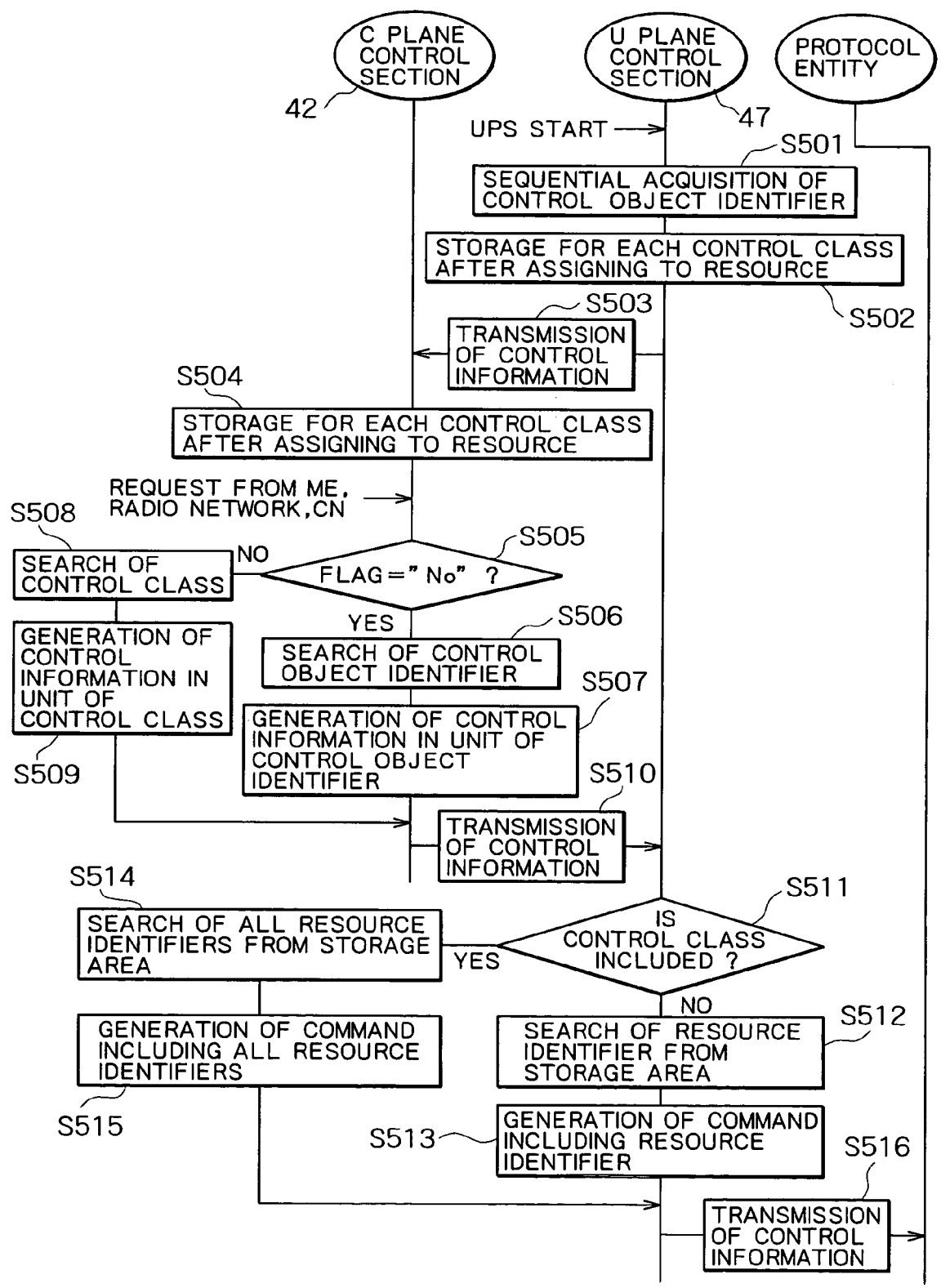
FIG. 14 is a flow diagram showing the process in a fifth embodiment.

In the following, the function in the fifth embodiment will be described. FIG. 14 is a flow diagram showing the process executed between the U plane control section 47 and the C plane control section 42. FIG. 15 shows an example of the content of a third table, and FIG. 16 shows an example of the control information.

The U plane control section 47 sequentially acquires control object identifier for identifying the control object in the protocol entity for each control class (for example, the radio network governed under UPS 22, the cell managed by UPS 22 and others) in the timing of UPS 22 started (step S501), and assigns the control object identifier and a resource identifier for identifying the resource managed by UPS to each other, and then stores them for each control class in a storage area of the U plane control section 47 (step S502). Thereafter, the U plane control section 47 sends the control information including a set of the control class and all of the received control object identifiers to the C plane control section 42 (step S503).

The C plane control section 42 takes a correspondence between the control object identifier included in the received control information and the resource managed by CPS 21, and stores them into the storage area of the C plane control section 42 for each control class, as described above (step S504). Then, the C plane control section 42 confirms a flag in accordance with the request from ME 12, radio network 16 or CN 13, referring to the third table (step S505). As shown in FIG. 15, a flag of "Yes" or "No" is specified to each request in the third table. In this case, "Yes" means the execution of the control in package, whereas "No" means the non-execution of the control in package. In the case of flag "No", the C plane control section 42 searches in the storage area the control object identifier, which is identical to the control identified included in the request (step S506), and then generates control information by assembling the control command in the unit of the control object identifier (step S507), and further sends the control information to the U plane control section 47 (step S510). However, in the case of flag "Yes" in the third table, the C plane control section 42 searches in the storage area for the control class including the control object identifier which is included in the request (step S508), and then generates control information by assembling the control commands in the unit of control class (step S509), and further goes to step S510 to send the control information to the U plane control section 47.

In conjunction with the above, the U plane control section 47 confirms as to whether or not the received control command includes the control class (step S511). In the case when no control class is included, the U plane control section 47 searches the resource identifier assigned to the control object identifier in the storage area (step S512), and generates the control command including the searched resource identifier (step S513), and then sends the control command to the protocol entity (step S516). On the other hand, when the control class is included in step S511, the U plane control section 47 searches in the storage area all of the resource identifiers stored in conjunction with the control class (step S514), and generates a control command including all of the resource identifies thus searched (step S515), and then goes to step S516 to send the control command to the protocol entity. FIG. 16 shows an example of the control information in this case.

Figure 17:
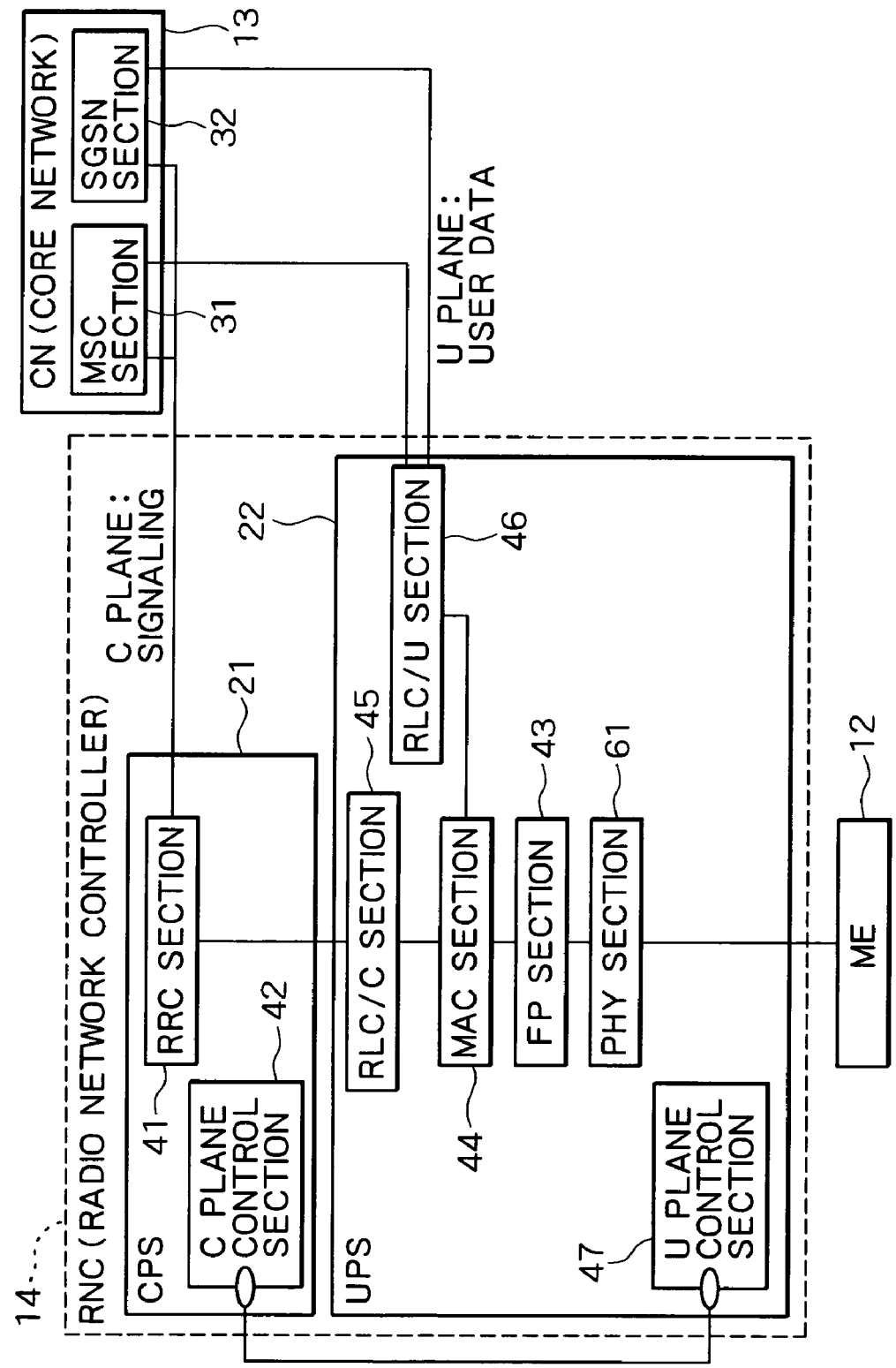
FIG. 17 is a block diagram showing the structure of a mobile communication system including a radio access network in another embodiment of the invention.

Although various embodiments of the present invention are elucidated in the above description, one of these embodiments is applicable to a system in which a radio access network (RAN) comprises a CPS 21 and a UPS formed by unifying the function of the radio network and the U plane control section executing the transmission control of user's data. FIG. 17 shows the structural arrangement of such a RAN. Although the RAN shown in FIG. 17 is similar to that in FIG. 2, the difference between them is that the radio network is not disposed independent of UPS 22, but the UPS 22 has the function of the radio network and is directly connected to the ME (mobile equipment) 12. Accordingly, the PHY section 61 disposed inside the radio network of the system shown in FIG. 2 is disposed in the UPS 22 of the system shown in FIG. 17. Even in the system shown in FIG. 17, the control information is exchanged between the C plane control section 42 and the U plane control section 47 in a procedure similar to those in the above-described embodiments, so that the control of operation in the radio access network can be executed.

While preferred embodiments have been shown and described, various modifications and substitutions may be made without departing from the spirit and scope of the invention. Accordingly, it is to be understood that the present invention has been described by way of examples, and not by limitations.

What is claimed is:

1. A radio access network comprising a radio network controller including a plurality of user plane servers for executing the transmission control of user's data regarding a mobile equipment and a control plane server for executing the transmission control of a control signal for transmitting the user's data wherein each of said user plane servers includes at least one of protocol entity for executing the transmission control of said user's data regarding the mobile equipment and U plane control section, wherein said control plane server includes at least one of protocol entity for executing the transmission control of a control signal for transmitting the user's data and C plane control section, and wherein a logical connection for transmitting control information is associated between said U plane control section and said C plane control section, in which case, said U plane control section and said C plane control section communicates with each other, wherein said control information includes at least one of more than one control command including a protocol entity identifier for uniquely identifying a protocol entity to be controlled between said user plane servers and said control plane server and more than one confirmation response command for said control command, wherein each of said C plane control section and said U plane control section includes a first table in which a one to one correspondence is given between a received request and a set of a response method for the protocol entity to be controlled and the control command and the response time, wherein one of said C plane control section and said U plane control section generates said control information, referring to said first table, and sends the same to the other of said C plane control section and said U plane control section, whereas the other of said C plane control section and said U plane control section extracts a set of the protocol entity identifier and the control command from the received control information, and distributes said extracted control command to the respective protocol entities included in said received control information, and further generates control information from the confirmation response received from said respective protocol entities and then sends the same as a reply to the one of said C plane control section and said U plane control section.

2. A radio access network according to claim 1, wherein said control commands are arranged in said control information in the sequence of control, and wherein each of said U plane control section and said C plane control section sequentially extracts a set of said protocol entities identifier and said control command, and distributes said control command to the respective protocol entities included in said control information in the sequence of extraction, and further generates said control information after rearranging the same in the sequence of extraction in the case when the control information is generated from said confirmation response received from said respective protocol entities and the control information thus generated is sent as a reply.

3. A radio access network according to claim 1, wherein said control command further includes a response identifier, and wherein each of said U plane control section and said C plane control section extracts said protocol entity, said response identifier and said control command in a set when the set of said protocol entity identifier and said control command is extracted, and stores a set of said extracted protocol entity identifier and response identifier into a storage area, and further generates said control information according to said response identifier, when the control information is generated from the confirmation response received from said respective protocol entities and the control information thus generated is sent as a reply.

4. A radio access network according to claim 1, wherein said control information is uniquely identified between said user plane servers and said control plane server on the basis of a transaction identifier included in said control information, and wherein when one of said U plane control section and said C plane control section cannot receive a response to transaction from the other of said U plane control section and said C plane control section within the resending time after sending the transaction, the one of said U plane control section and said C plane control section resends the transaction, and determines said resending time, based upon the sum of the reciprocating transmission time and the response time to each control command.

5. A radio access network according to claim 1, wherein said control information includes a set of a transaction identifier, more than one control object identifier for uniquely identifying a control object of the protocol entity between said user plane servers and said control plane server and more than one control command, wherein said U plane control section acquires said control object identifier in the timing of said user plane server starting, and stores said acquired control object identifier and a resource managed by said user plane server into a storage area of said U plane control section after assigning said control object identifier and said resource to each other, and further sends the control information including all of the stored control object identifiers to said C plane control section, wherein said C plane control section stores the control object identifier included in said received control information and the resource managed by said control plane server into a storage area of said C plane control section after assigning said control object identifier and said resource to each other, and wherein one of said U plane control section and said C plane control section searches from the storage area of the corresponding control section a control object identifier which is identical to the control object identifier included in said request, and generates control information by assembling a control command in a unit of control object identifier, referring to said request and said first table, and then sends the same to the other of said U plane control section and said C plane control section.

6. A radio access network according to claim 1, wherein said control command includes one of a set of a request, command name and command identifier and information element, and a set of a request identifier for uniquely identifying said request between said user plane server and said command plane server and an information element keyword or a combination thereof, and wherein each of said U plane control section and said C plane control section includes a second table in which a set of said request identifier and information element keyword is assigned to said information element in a one to N correspondence, and generates a control command by extracting said request identifier and said information element keyword from said control command, and then distributes said control command to said respective protocol entities.

7. A radio access network according to claim 5, wherein said U plane control section acquires said control object identifier in a continuous value in the timing of said user plane server starting, wherein said C plane control section assigns the control object identifier included in said received control information and the resource managed by the control plane server to each other, and stores the same into a storage area of said C plane control section after classifying the same in a unit of said user plane server, and wherein each of said U plane control section and said C plane control section includes a third table in which a request is assigned to a flag of representing whether the control in package is carried out in a unit of the user plane server in a one to one correspondence, and one of said U plane control section and said C plane control section searches from the storage area for a group of the user plane server unit including a control object identifier which is identical to the control object identifier included in said request, and then generates control information by assembling a control command from said request in a unit of the user plane server group, and further sends the same to the other of said U plane control section and said C plane control section.

8. A radio access network according to claim 6, wherein said U plane control section acquires said control object identifier in a continuous value in the timing of said user plane server starting, wherein said C plane control section assigns the control object identifier included in said received control information and the resource managed by the control plane server to each other, and stores the same into a storage area of said C plane control section after classifying the same in a unit of said user plane server, and wherein each of said U plane control section and said C plane control section includes a third table in which a request is assigned to a flag of representing whether the control in package is carried out in a unit of the user plane server in a one to one correspondence, and one of said U plane control section and said C plane control section searches from the storage area for a group of the user plane server unit including a control object identifier which is identical to the control object identifier included in said request, and then generates control information by assembling a control command from said request in a unit of the user plane server group, and further sends the same to the other of said U plane control section and said C plane control section.

9. A radio access network according to claim 1, wherein said radio access network is equipped with a plurality of radio networks, and each of said radio networks controls a corresponding cell to which a mobile equipment pertains.

10. A radio access network according to claim 1, wherein said user plane server is equipped with a radio network function for controlling the cell to which a mobile equipment pertains.

11. An operation control method in a radio access network including a radio network controller, a plurality of radio networks, mobile equipments each included in a cell governed under each of said radio networks, wherein said radio network controller is composed of a plurality of user plane servers each having at least one of protocol entity for executing the transmission control of user's data regarding said mobile equipment and a control plane server having at least one of protocol entity for executing the transmission control of a control signal for transmitting the user's data, wherein said control information includes at least one of more than one control command including a protocol entity identifier for uniquely identifying a protocol entity to be controlled between said user plane server and said control plane server and more than one confirmation command for said control command, wherein each of said user plane server and said control plane server has a first table in which a received request and a set of the protocol entity to be controlled, a response method to the control command and the response time is assigned to each other in a one to one correspondence, and wherein said operation control method comprising the steps of:

providing a logical connection for sending the control information between said user plane server and said control plane server to execute the communication therebetween;

generating said control information by one of said user plane server and said control plane server, referring to said first table to send the same to the other of said user plane server and said control plane server;

extracting a set of a protocol entity identifier and a control command from said received control information to distribute said control command thus extracted to the respective protocol entities included in said received control information; and generating control information from the confirmation response received from said respective protocol entities to send the same as a reply to the other of said user plane server and said control plane server.

12. An operation control method according to claim 11, wherein said control commands are arranged in said control information in the sequence of control, wherein said step of distribution further includes a step of sequentially extracting a set of said protocol entity identifier and said control command to distribute the same in the sequence of extraction when said control command is distributed to the respective protocol entities included in said control information, and wherein said step of sending as a reply includes a step of generating said control information after rearranging the same in the sequence of extraction.

13. An operation control method according to claim 11, wherein said control command further includes a response identifier, wherein said step of distribution includes a step of extracting said protocol entity, said response identifier and said control command in a set to store a set of said extracted protocol entity identifier and response identifier in a storage area, and wherein said step of sending as a reply includes a step of generating said control information according to said response identifier.

14. An operation control method according to claim 11, wherein said control information is uniquely identified between said user plane server and said control plane server by the transaction identifier included in said control information, wherein said operation control method further includes the steps of:

resending a transaction when one of said user plane servers and said control plane server cannot receive said transaction from the other of said user plane servers and said control plane server within the resending time after sending the transaction; and determining said resending time, based on the sum of the reciprocating transmission time and the response time for each control command.

15. An operation control method according to claim 11, wherein said control information includes a transaction identifier, more than one control object identifier for uniquely identifying the control object of the protocol entity between said user plane servers and said control plane server and more than one control command in a set, wherein said operation control method further includes the steps of:

acquiring said control object identifier in said user plane server in the timing of said user plane server starting and storing said control object identifier thus acquired and the resource managed by said user plane server after assigning the same to each other to send the control information including all of said stored control object identifiers to said control plane server;

storing the control object identifier included in said received control information and the resource managed by said control plane server into a storage area of said control plane server after assigning the same to each other in said control plane server; and searching in the storage area of said control plane server for a control object identifier which is identical to the control object identifier included in said request and generating control information by assembling a control command in a unit of the control object identifier, referring to said request and said first table to send the same to the other of said user plane servers and said control plane server.

16. An operation control method according to claim 11, wherein said control command includes one of a set of the request, command name and command identifier and information element, a set of a request identifier for uniquely identifying said request between said user plane servers and said control plane server and an information element keyword or a combination thereof, wherein one of said user plane servers and said control plane server includes a second table in which a set of said request identifier and the information element keyword is assigned to said information element in a one to N correspondence; and wherein said operation control method further includes the step of extracting said request identifier and said information element keyword from said control command to generate a control command, and distributing said control command to said respective protocol entities.

17. An operation control method according to claim 15, wherein a third table is disposed, in which a request is assigned to a flag representing whether or not the control in package is carried out in the unit of user plane server, wherein said operation control method further includes the steps of:

acquiring said control object identifier in a continuous value in said user plane server in the timing of said user plane server starting;

classifying the control object identifier included in said received control information and the resource managed by said control plane server after assigning the same to each other to store the same in a storage area of said control plane server after classifying the same in a unit of said user plane server; and searching from the storage area for a user plane server unit group including a control object identifier which is identical to the control object identifier included in said request and generating control information by assembling the control command in the user plane server group unit from said request to send the control command to the other of said user plane servers and said control plane server.

18. An operation control method according to claim 16, wherein a third table is disposed, in which a request is assigned to a flag representing whether or not the control in package is carried out in the unit of user plane server, wherein said operation control method further includes the steps of:

acquiring said control object identifier in a continuous value in said user plane server in the timing of said user plane server starting;

classifying the control object identifier included in said received control information and the resource managed by said control plane server after assigning the same to each other to store the same in a storage area of said control plane server after classifying the same in a unit of said user plane server; and searching from the storage area for a user plane server unit group including a control object identifier which is identical to the control object identifier included in said request and generating control information by assembling the control command in the user plane server group unit from said request to send the control command to the other of said user plane servers and said control plane server.

\* \* \* \* \*